(12) United States Patent
Lim

(10) Patent No.: US 10,613,686 B2
(45) Date of Patent: Apr. 7, 2020

(54) TOUCH DEVICE AND SIGNAL PROCESSING CIRCUIT AS WELL AS OPERATING METHOD THEREOF

(71) Applicant: PixArt Imaging Inc., Hsin-Chu County (TW)

(72) Inventor: Wooi-Kip Lim, Penang (MY)

(73) Assignee: PIXART IMAGING INC., Hsin-Chu County (TW)

(*) Notice: Subject to any disclaimer, the term of this patent is extended or adjusted under 35 U.S.C. 154(b) by 0 days.

(21) Appl. No.: 16/291,020

(22) Filed: Mar. 4, 2019

(65) Prior Publication Data
US 2019/0204988 A1    Jul. 4, 2019

Related U.S. Application Data

(63) Continuation of application No. 15/470,055, filed on Mar. 27, 2017, now Pat. No. 10,268,314.

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC .... G06F 3/044; G06F 3/0418; G06F 17/5063; G06F 1/02
See application file for complete search history.

(56) References Cited

U.S. PATENT DOCUMENTS

| | | | |
|---|---|---|---|
| 8,610,443 B1* | 12/2013 | Ryshtun | G06F 3/03545 324/683 |
| 9,430,105 B2* | 8/2016 | Yao | G06F 3/044 |
| 2012/0280965 A1* | 11/2012 | Lee | G09G 3/3677 345/212 |
| 2015/0214899 A1* | 7/2015 | Lim | H03F 1/26 345/174 |

* cited by examiner

*Primary Examiner* — Xuemei Zheng
(74) *Attorney, Agent, or Firm* — WPAT, PC

(57) ABSTRACT

A signal processing circuit of a touch device including an operational amplifier, a feedback resistor and a step current circuit is provided. The feedback resistor connects between a negative input and an output terminal of the operational amplifier. The step current circuit is coupled to the negative input of the operational amplifier and configured to provide or draw a step current to reduce the current flowing through the feedback resistor so as to compensate the voltage offset of the operational amplifier.

14 Claims, 6 Drawing Sheets

TOUCH DEVICE AND SIGNAL PROCESSING CIRCUIT AS WELL AS OPERATING METHOD THEREOF

RELATED APPLICATIONS

The present application is a continuation application of U.S. application Ser. No. 15/470,055, filed on Mar. 27, 2017, the disclosures of which are hereby incorporated by reference herein in their entirety.

BACKGROUND

1. Field of the Disclosure

This disclosure generally relates to a touch device, more particularly, to a touch device and a signal processing circuit as well as an operating method thereof that may reduce the offset error caused by the offset voltage of an operational amplifier to increase the signal dynamic range.

2. Description of the Related Art

Touch device or touch panel is used to detect touch signal resulting from a touch event or press event. The detection signals outputted by the touch panel are successively processed by an analog front end and a digital back end to accordingly identify whether the touch panel is operated by a user.

The analog front end may adopt an integrated programmable gain amplifier (IPGA) as shown in FIG. 1 to amplify the detection signals. The IPGA includes an operational amplifier which has an offset between two input terminals due to the manufacturing process, and this offset causes an offset voltage which can reduce a signal dynamic range of the digital back end connected downstream such that the signal-to-noise ratio (SNR) and the operating performance of the touch panel are degraded.

Accordingly, the present disclosure provides a touch device and a signal processing circuit as well as an operating method thereof that may eliminate or at least significantly alleviate the signal dynamic range decrease caused by the offset voltage of the operational amplifier.

SUMMARY

The present disclosure provides a touch device and a signal processing circuit as well as an operating method thereof that may reduce the occupied area of a compensation capacitor in the IPGA by employing an attenuation circuit.

The present disclosure further provides a touch device and a signal processing circuit as well as an operating method thereof that may alleviate the influence of the offset voltage of an operational amplifier by employing a step current circuit to accordingly maintain the signal dynamic range.

The present disclosure provides a signal processing circuit of a touch device including an integrated programmable gain amplifier (IPGA), an attenuation circuit and a step current circuit. The IPGA includes a first operational amplifier, a feedback resistor, a compensation capacitor and an input resistor. The first operational amplifier has a positive input, a negative input and an output terminal. The feedback resistor connects between the negative input and the output terminal of the first operational amplifier. The compensation capacitor connects between the negative input and the output terminal of the first operational amplifier. A first terminal of the input resistor is coupled to the negative input of the first operational amplifier. The attenuation circuit is coupled to a second terminal of the input resistor to split a current flowing through the input resistor. The step current circuit is coupled to the negative input of the first operational amplifier, and configured to provide a step current to the IPGA or draw a step current from the IPGA, the step current circuit comprising a current mirror circuit which comprises a plurality of switching devices configured to determine the step current during a touch detection according to previously stored control codes.

The present disclosure further provides a touch device including a capacitive touch panel and a control chip. The capacitive touch panel includes a plurality of sense electrodes each configured to output a detection signal. The control chip includes a plurality of integrated programmable gain amplifiers (IPGAs), a plurality of attenuation circuits and a plurality of step current circuits. The IPGAs are respectively coupled to the plurality of sense electrodes to amplify the detection signal. Each of the IPGAs includes a first operational amplifier, a feedback resistor, a compensation capacitor and an input resistor. The first operational amplifier has a positive input, a negative input and an output terminal. The feedback resistor connects between the negative input and the output terminal of the first operational amplifier. The compensation capacitor connects between the negative input and the output terminal of the first operational amplifier. A first terminal of the input resistor is coupled to the negative input of the first operational amplifier. Each of the attenuation circuits is coupled to a second terminal of the input resistor of one of the IPGAs, and configured to split a current flowing through the input resistor. Each of the step current circuits is coupled to the negative input of the first operational amplifier of one of the IPGAs, and configured to provide a step current to the coupled IPGA or draw a step current from the coupled IPGA, each of the plurality of step current circuits comprising a current mirror circuit which comprises a plurality of switching devices configured to determine the step current to be provided to or drawn from the coupled IPGA during a touch detection according to previously stored control codes.

The present disclosure further provides an operating method of a touch device. The touch device includes a capacitive touch panel, an integrated programmable gain amplifier (IPGA), an attenuation circuit, a step current circuit and an analog-to-digital converter. The capacitive touch panel, the attenuation circuit, the step current circuit and the analog-to-digital converter are coupled to the IPGA. The attenuation circuit attenuates a gain of the IPGA. The step current circuit includes a current mirror circuit which comprises a plurality of switching devices. The analog-to-digital converter is coupled to the IPGA. The operating method includes the steps of: receiving, by the IPGA, a detection signal outputted by the capacitive touch panel to output an amplified detection signal; converting, by the analog-to-digital converter, the amplified detection signal to a digital signal; controlling on/off of the plurality of switching devices of the step current circuit to provide a step current to the IPGA or draw a step current from the IPGA according to the digital signal to reduce an offset current value caused by an offset voltage difference between the IPGA and the attenuation circuit; and storing a control code for controlling the on/off of the plurality of switching devices to cause the offset current value to have a smallest value.

The step current circuit of the present disclosure is a current mirror circuit. The current mirror circuit provides a step current to an integrated programmable gain amplifier (IPGA) or draws a step current from the IPGA to reduce the current flowing through a feedback resistor of an operational amplifier. Therefore, it is possible to eliminate or reduce at least a part of the signal dynamic range decrease caused by the offset voltage of the operational amplifier.

The attenuation circuit of the present disclosure is connected to the IPGA for reducing a gain thereof so as to prevent the output saturation of the IPGA. Accordingly, it is not necessary to reduce the gain of the IPGA by increasing a compensation capacitor of the IPGA such that the occupied area of the compensation capacitor in the control chip is significantly reduced.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 2:
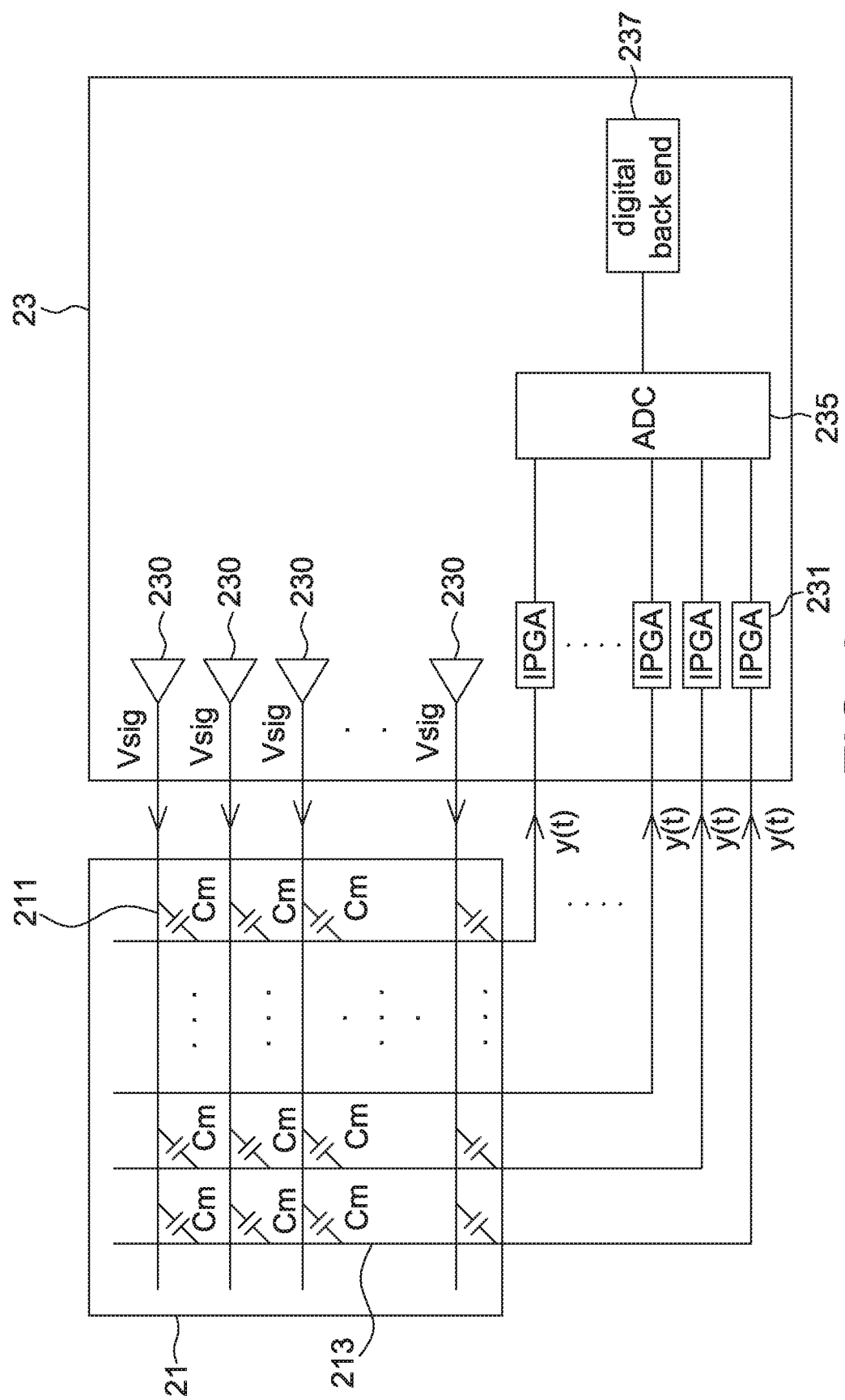
FIG. 2 is a schematic block diagram of a touch device according to one embodiment of the present disclosure.

Referring to FIG. 2, it is a schematic block diagram of a touch device according to one embodiment of the present disclosure. The touch device includes a capacitive touch panel 21 and a control chip 23. The touch device can be used to detect capacitance variance from a conductive object closing the capacitive touch panel 21 or an external force applied to the capacitive touch panel 21. The control chip 23 includes a signal processing circuit for processing detection signals y(t) outputted by the capacitive touch panel 21, wherein the detection signals y(t) are, for example, alternating current (ac) voltage signals. The control chip 23 is electrically connected to the capacitive touch panel 21 via, for example, at least one bus line to communicate the detection signals y(t) and control signals therebetween.

The capacitive touch panel 21 includes, for example, a plurality of drive electrodes 211 and a plurality of sense electrodes 213. For example, the plurality of sense electrodes 213 intersects the plurality of drive electrodes 211 to form mutual capacitors Cm therebetween. The plurality of drive electrodes 211 is used to receive drive signals Vsig, and the plurality of sense electrodes 213 is used to output the detection signals y(t) according to the induction of the mutual capacitors Cm. When a conductor (e.g., a finger or a stylus) approaches or touches the capacitive touch panel 21, the capacitance of the mutual capacitors Cm is changed to influence the detection signals y(t), and thus the control chip 23 is able to identify a touch position, gesture or the like according the variation of the detection signals y(t) to perform corresponding controls, wherein said corresponding controls performed by the control chip 23 is determined according to different applications without particular limitations, such as controlling a cursor, activating application software, moving an icon and so on. The method that the control chip 23 identifies the touch control on the capacitive touch panel 21 according to the mutual capacitance variation is known to the art, e.g., identifying the voltage signal variation or charging/discharging time interval variation, and thus details thereof are not described herein.

It should be mentioned that although FIG. 2 shows the plurality of drive electrodes 211 extending along a transverse direction and the plurality of sense electrodes 213 extending along a longitudinal direction, it is only intended to illustrate but not to limit the present disclosure. The spatial relationship between the plurality of drive electrodes 211 and the plurality of sense electrodes 213 is determined according to different arrangements as long as the mutual capacitors Cm are formed between the plurality of drive electrodes 211 and the plurality of sense electrodes 213.

In addition, the detection signals y(t) are not limited to be generated according to the induction of the mutual capacitors Cm, and it is possible that the detection signals y(t) are generated according to the induction of the self-capacitance of the plurality of drive electrodes 211 and/or the plurality of sense electrodes 213. Operations of the self-capacitance mode and the mutual capacitance mode may be referred to U.S. patent application Ser. No. 14/697,923, filed on Apr. 28, 2015, assigned to the same Assignee of the present application, and the full disclosure of which is incorporated herein by reference.

The control chip 23 includes a plurality of drive circuits 230 for driving the capacitive touch panel 21 and a signal processing circuit for processing the detection signals y(t) outputted by the capacitive touch panel 21. The plurality of drive circuits 230 is, for example, signal generators. Each of the plurality of drive circuits 230 is respectively coupled to one of the plurality of drive electrodes 211 to drive the coupled drive electrode 211 using a drive signal Vsig. In some embodiments, each of the plurality of drive circuits 230 is coupled to the corresponding drive electrode 211 via a switching element (not shown), and the switching element is used to control whether the drive signal Vsig is inputted into the coupled drive electrode 211 or not. For example, the drive signal Vsig is inputted into the capacitive touch panel 21 in a normal stage, but is not inputted into the capacitive touch panel 21 in a calibration stage.

The signal processing circuit herein is referred to the circuit coupled downstream of the capacitive touch panel 21. The signal processing circuit includes, for example, a plurality of integrated programmable gain amplifiers (IPGAs) 231, a plurality of attenuation circuits (described later), an analog-to-digital converter (ADC) 235 and a digital back end 237, wherein the plurality of IPGAs 231 is coupled to the ADC 235 via, for example, a plurality of switching elements or a multiplexer. The plurality of IPGAs 231 is respectively coupled to the plurality of sense electrodes 213 (e.g., via a plurality of switching elements) to amplify the detection signals y(t). In the present disclosure, as each of the plurality of attenuation circuits is coupled to one IPGA 231, it is possible to consider that each of the attenuation circuits is included in one of the IPGAs 231.

Figure 3:
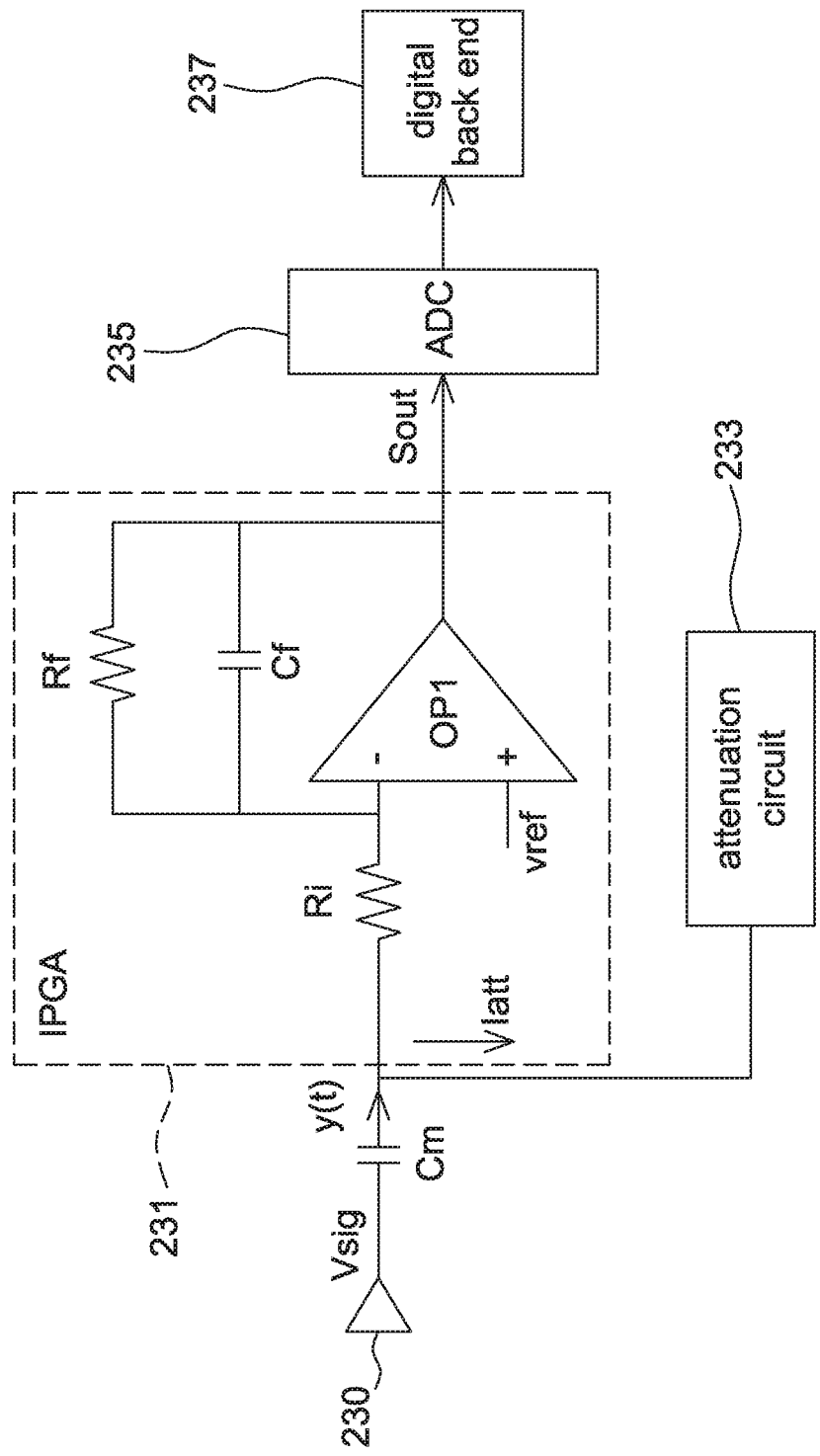
FIG. 3 is a schematic block diagram of a signal processing circuit of a touch device according to one embodiment of the present disclosure.

Please referring to FIG. 3, it is a schematic block diagram of a signal processing circuit of a touch device according to one embodiment of the present disclosure, wherein FIG. 3 shows only one of the plurality of IPGAs 231 in FIG. 2 and the corresponding mutual capacitor Cm and drive circuit 230 thereof. Other IPGAs 231 and the corresponding mutual capacitor Cm and drive circuit 230 are the same. Each of the IPGAs 231 includes a first operational amplifier OP1, a feedback resistor Rf, a compensation capacitor Cf and an input resistor Ri, and is used to receive and process the detection signal y(t) outputted by the coupled sense electrode 213.

The first operational amplifier OP1 has a positive input (+), a negative input (−) and an output terminal. The positive input is coupled to a constant voltage source of 0.9 volt, but not limited thereto. The output terminal is used to output an amplified detection signal Sout to the ADC 235.

The ADC 235 is coupled to the output terminal of the first operational amplifier OP1, and used to convert the amplified detection signal Sout to a digital signal. The digital back end 237 is coupled to the ADC 235, and used to control on/off of a plurality of switching devices according to the digital signal (described below with an example). The ADC 235 may be included in the analog front end or the digital back end without particular limitations.

The feedback resistor Rf is connected between the negative input and the output terminal of the first operational amplifier OP1. The compensation capacitor Cf is also connected between the negative input and the output terminal of the first operational amplifier OP1 to form a parallel connection with the feedback resistor Rf. A first terminal (e.g., the right end in FIG. 3) of the input resistor Ri is coupled to the negative input of the first operational amplifier OP1, and a second terminal (e.g., the left end in FIG. 3) of the input resistor Ri is coupled to one of the plurality of sense electrodes 213 for receiving the detection signal y(t) outputted therefrom.

The attenuation circuit 233 is coupled to the second terminal of the input resistor Ri for splitting a current flowing through the input resistor Ri (e.g., a current Iatt being shown in FIG. 3) to attenuate a gain of the IPGA 231.

Figure 1:
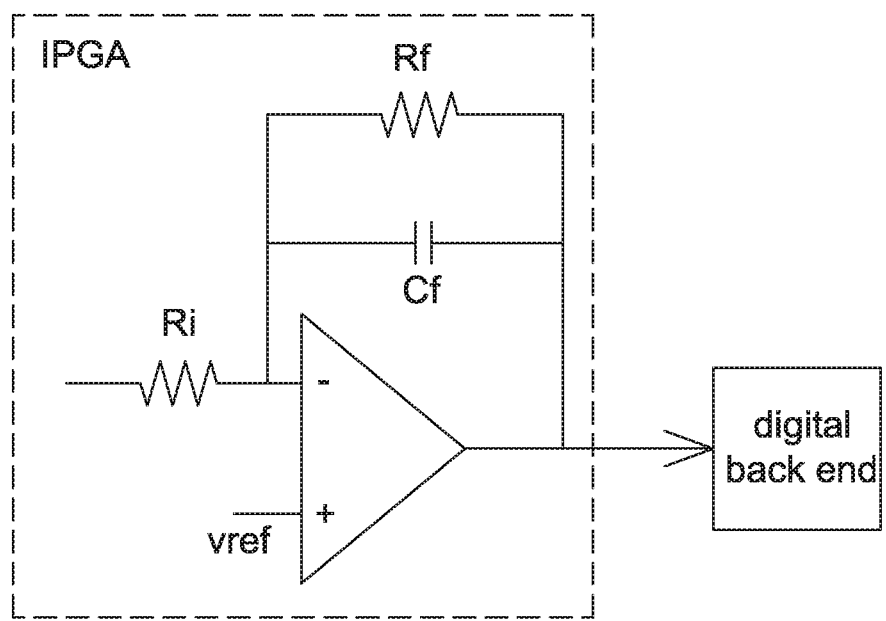
FIG. 1 is a schematic block diagram of a conventional signal processing circuit of a touch panel.

It is known that in order to prevent the output saturation of the IPGA shown in FIG. 1, it is possible to reduce the gain thereof by increasing the capacitance of the compensation capacitor Cf. However, a larger compensation capacitor Cf can occupy a larger area in the control chip 23. To maintain or reduce the capacitance of the compensation capacitor Cf, in the present disclosure the attenuation circuit 233 is employed to reduce the gain of the IPGA 231.

In the present disclosure, the attenuation circuit 233 may use a suitable circuit without particular limitations as long as the purpose of reducing the gain of the IPGA 231 is achievable.

Figure 4:
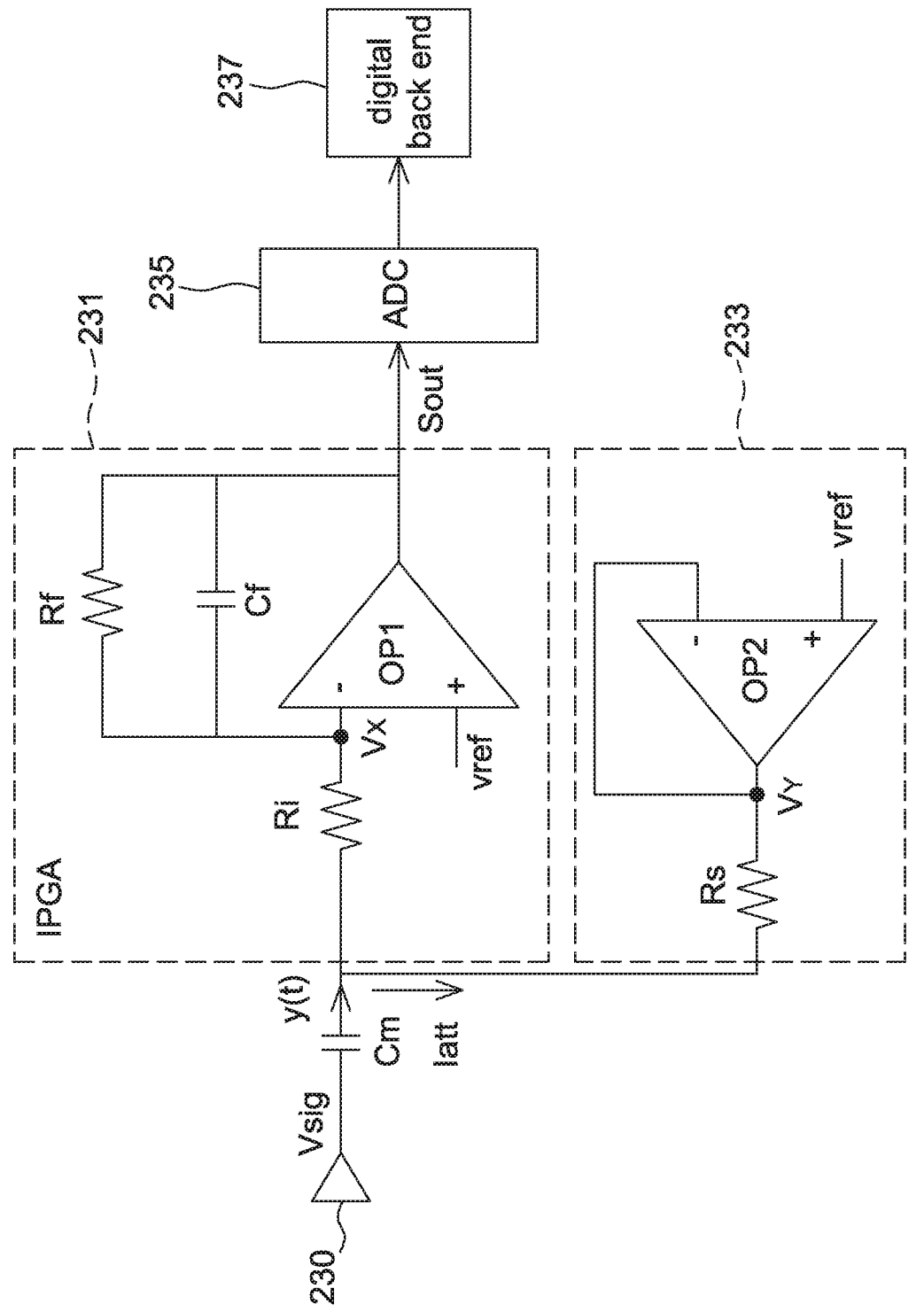
FIG. 4 is a schematic block diagram of a signal processing circuit of a touch device according to another embodiment of the present disclosure.

For example referring to FIG. 4, it is a schematic block diagram of a signal processing circuit of a touch device according to another embodiment of the present disclosure. In this embodiment, the attenuation circuit 233 includes a second operational amplifier OP2 and a shunt resistor Rs. The second operational amplifier OP2 has a positive input (+), a negative input (−) and an output terminal. The output terminal of the second operational amplifier OP2 is directly coupled to the negative input of the second operational amplifier OP2 to form a voltage follower. The shut resistor Rs has a first terminal (e.g., the right end in FIG. 4) coupled to the output terminal of the second operational amplifier OP2, and a second terminal (e.g., the left end in FIG. 4) coupled to the second terminal of the input resistor Ri to couple to one of the plurality of sense electrodes 213 together with the input resistor Ri.

In some circumstances, due to the manufacturing process, it is possible that the operational amplifiers OP1 and OP2 have different features, and the offset of individual operational amplifiers OP1 and OP2 may further cause an offset existing between the first operational amplifier OP1 of the IPGA 231 and the attenuation circuit 233 due to the mismatch therebetween. Therefore, an offset voltage exists between the operational amplifiers OP1 and OP2, e.g., a voltage difference between nodes $V_X$ and $V_Y$. This offset voltage difference can generate an offset current flowing through the feedback resistor Rf to cause an offset of the amplified detection signal Sout such that an operable dynamic range of the ADC 235 is reduced. More specifically, although it is able to reduce the capacitance of the compensation capacitor Cf by disposing the attenuation circuit 233, the offset current caused by the offset voltage difference between the IPGA 231 and the attenuation circuit 233 is generated to flow through the input resistor Ri and the feedback resistor Rf.

For example, if it is assumed that the feedback resistor Rf is 100 Kohm, the input resistor Ri is 32 Kohm and the shunt resistor Rs is 1 Kom, a dc gain Rf/(Ri+Rs) is calculated to be about 3. If it is further assumed that the offset voltages of the first operational amplifier OP1 and the second operational amplifier OP2 are both 30 mV, a maximum possible offset voltage difference between the first operational amplifier OP1 and the second operational amplifier OP2 is up to 60 mV. After the amplification of the IPGA 231, the maximum possible offset voltage can reach 60×3=180 mV. If an operable dynamic range of the ADC 235 is 400 mV, the 180 mV offset voltage is 45% of the operable dynamic range. It is clear that the operating performance of the capacitive touch panel 21 can be significantly degraded. In addition, to maintain the cutoff frequency $1/(2\pi \times Rf \times Cf)$ of the IPGA 231, in some embodiments a value of the feedback resistor Rf is increased such that the influence caused by the offset voltage is further enhanced.

The present disclosure further provides a signal processing circuit capable of eliminating or significantly reducing the offset voltage mentioned above.

Figure 5:
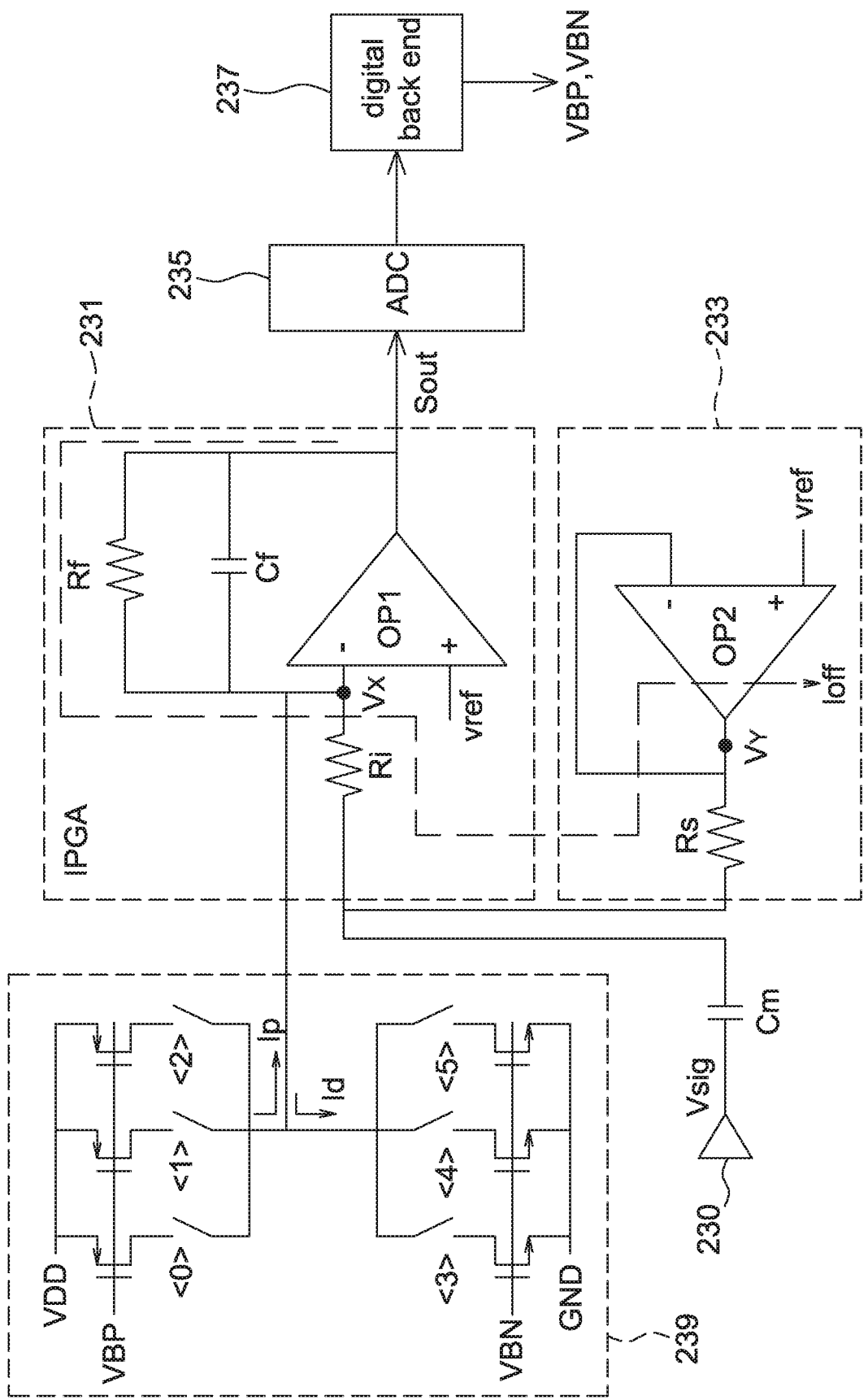
FIG. 5 is a schematic block diagram of a signal processing circuit of a touch device according to an alternative embodiment of the present disclosure.

Referring to FIG. 5, it is a schematic block diagram of a signal processing circuit of a touch device according to an alternative embodiment of the present disclosure. In this embodiment, the signal processing circuit further includes a plurality of step current circuits 239. Each of the plurality of step current circuits 239 is respectively coupled to the negative input of the first operational amplifier OP1 of one of the IPGAs 231, and used to provide a step current to the coupled IPGA 231 or draw a step current from the coupled IPGA 231, wherein the step current herein is referred to that the current provided or drawn by the step current circuits 239 is not changed continuously but changed by a fixed value in a step-by-step manner. Similarly, in this embodiment, as each of the plurality of step current circuits 239 is coupled to one of the IPGAs 231, it is possible to consider that each of the plurality of step current circuits 239 is a part of one IPGA 231.

In one embodiment, the step current circuit 239 includes a current mirror circuit. The current mirror circuit includes a plurality of switching devices (e.g., 6 switching devices 0 to 5 being shown in FIG. 5 such as PMOS switching devices and/or NMOS switching devices). The current mirror circuit is controlled by the digital back end 237, and the current flowing through the feedback resistor Rf is controlled to have a smallest value by turning on/off the plurality of switching devices (described below).

For example, the operation of the touch device of the present disclosure includes a calibration stage and a normal stage, wherein the calibration stage is referred to a stage of a starting procedure, ending a sleep mode or receiving a command during which there is no conductor approaching or touching the touch device and the touch detection is not being performed, while the normal stage is referred to a stage during which the touch device is performing the touch detection. The two stages are distinguishable, for example, by identifying whether the drive signal Vsig is inputted or activated.

For example, in the calibration stage, the plurality of drive circuits 230 of the control chip 23 does not input the drive signals Vsig to the corresponding drive electrodes 211. Meanwhile, the digital back end 237 previously stores predetermined digital values (e.g., stored before shipment) associated with the drive signal Vsig not being used to drive the drive electrodes 211. When the above mentioned offset voltage exists, the digital value formed by the ADC 235 converting the amplified detection signal Sout and being inputted to the digital back end 237 is different from (larger or smaller than) the predetermined digital value.

The digital back end 237 controls multiple switching devices in the step current circuit 239, e.g., sending a control signal VBP to control switching devices 0 to 2 to cause the voltage source VDD to provide a step current Ip to the corresponding IPGA 231, or sending a control signal VBN to control switching devices 3 to 5 to draw a step current Id from the corresponding IPGA 231 to the ground GRD. That is, the step current circuit 239 includes a current source and a current sink. The goal of the control is to obtain a control code (e.g., having a predetermined bit) of the multiple switching devices allowing the current flowing through the feedback resistor Rf to have a smallest value, i.e. the digital value outputted by the ADC 235 being close to or even equal to the predetermined digital value. Meanwhile, the obtained control code is stored in a storage device of the digital back end 237, e.g., storing in a volatile memory such as a random access memory (RAM) or a flash memory. The stored control code is for the digital back end 237 to control the on/off of the plurality of switching devices (e.g., switching devices 0 to 5) in the normal stage.

Following the above example, when the offset voltage difference between the first and second operational amplifiers OP1 and OP2 is 60 mV, the offset current is calculated as 60 mV/(32 Kohm+1 Kohm)=1.818 μAmp. If a 3-bits calibration is used, 7 different step currents are usable such that the calibration resolution is calculated as 1.818 μAmp/(7×2)=0.13 μAmp. The output offset voltage of the IPGA 231 is then calculated as 0.13 μAmp×100 Kohm=13 mV, which is significantly lower than the above uncalibrated value.

It is appreciated that as the manufacturing factor has different effects on each of the IPGAs 231 and the attenuation circuits 233, the digital back end 237 preferably pre-stores one control code corresponding to each of the plurality of IPGAs 231 such that the offset voltage of the amplified detection signal Sout outputted by each of the IPGAs 231 has a smallest value to improve the detection accuracy. In addition, the calibration resolution of the step current circuit 239 is determined by a number of the switching devices. If more switching devices are used, more accurate calibration is obtainable to obtain a smaller offset voltage. Therefore, a number of the switching devices actually being used is determined according to actual design without particular limitations.

Figure 6:
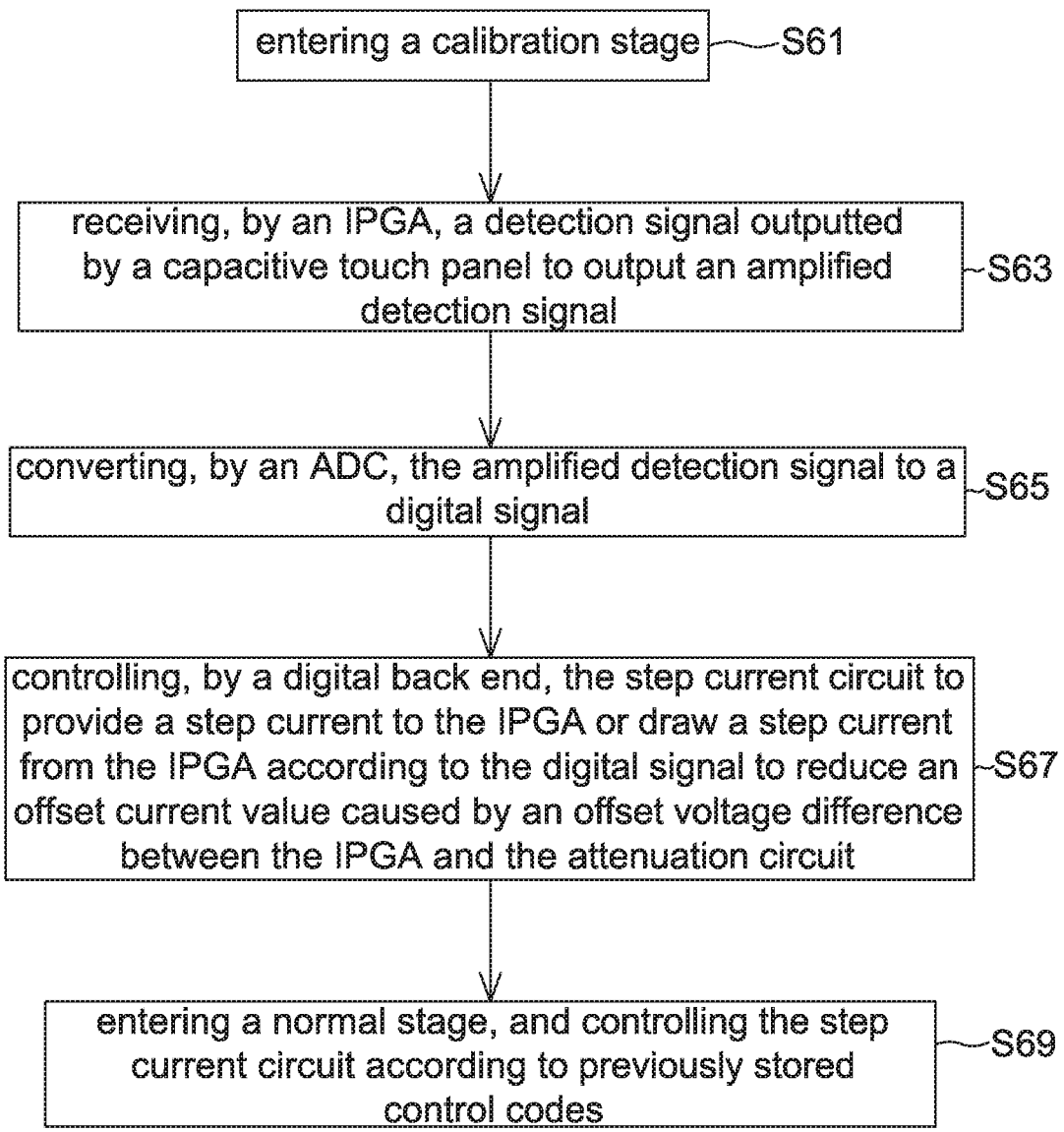
FIG. 6 is a flow chart of an operating method of a touch device according to one embodiment of the present disclosure.

Please referring to FIG. 6, it is a flow chart of an operating method of a touch device according to one embodiment of the present disclosure. The operating method includes the steps of: entering a calibration stage (Step S61); receiving, by an IPGA, a detection signal outputted by a capacitive touch panel to output an amplified detection signal (Step S63); converting, by an ADC, the amplified detection signal to a digital signal (Step S65); controlling, by a digital back end, the step current circuit to provide a step current to the IPGA or draw a step current from the IPGA according to the digital signal to reduce an offset current value caused by an offset voltage difference between the IPGA and the attenuation circuit (Step S67); and entering a normal stage, and controlling the step current circuit according to previously stored control codes (Step S69).

The operating method of this embodiment is adaptable to a touch device which includes the signal processing circuit of FIG. 5. As mentioned above, the touch device includes a capacitive touch panel 21, an integrated programmable gain amplifier (IPGA) 231, an attenuation circuit 233, a step current circuit 239, an analog-to-digital converter (ADC) 235 and a digital back end 237, wherein the capacitive touch panel 21, the attenuation circuit 233, the step current circuit 239 and the ADC 239 are coupled to the IPGA 231. The attenuation circuit 233 is used to attenuate a gain of the IPGA 231 by drawing a part of current. The ADC 235 is coupled between the IPGA 231 and the digital back end 237.

In this embodiment, the calibration stage is for storing the calibration parameter used in the normal stage, e.g., control codes for controlling a plurality of switching devices in the step current circuit 239, instead of performing the touch detection. The normal stage is for performing the touch detection according to the stored calibration parameter determined in the calibration stage.

Step S61: Firstly, during the starting procedure or at the end of the sleep mode, the touch device automatically performs the calibration mode. Or the digital back end 237 controls the touch device to enter the calibration stage after receiving an instruction signal, e.g., when a key is pressed or an APP is run.

Step S63: After the calibration stage is entered, the plurality of drive circuits 230 of the control chip 23 respectively inputs a predetermined constant voltage to the corresponding drive electrode 211 or does not input any signal to the corresponding drive electrode 211. Each of the IPGAs 231 receives the detection signal y(t) from the corresponding sense electrode 213 and performs the amplification according to a gain determined by the element parameter (e.g., the feedback resistor Rf, compensation capacitor Cf and input resistor Ri) to output an amplified detection signal Sout.

Step S65: The ADC 235 performs the analog-digital conversion on the amplified detection signal Sout outputted by each of the IPGAs 231 to output a digital signal corresponding to each of the IPGAs 231.

Step S67: The digital back end 237 receives the digital signal (e.g., a digital value), and compares the received digital signal with predetermined digital value. As mentioned above, the digital back end 237 preferably pre-stores predetermined digital values corresponding to each of the IPGAs 231. For example, when the received digital signal is larger or smaller than the predetermined digital value, the switching devices 0 to 2 are controlled to provide different step currents to the IPGA 231 or the switching devices 3 to 5 are controlled to draw different step currents from the IPGA 231 till the offset current formed by the offset voltage difference between the IPGA 231 and the attenuation circuit 233 has a smallest value, e.g., controlling the switching devices one-by-one in a predetermined sequence to obtain the smallest value. In this embodiment, the controlling of the switching devices 0 to 5 is formed as digital codes having a predetermined bit to be stored as the control codes.

When the control codes corresponding to every IPGA 231 are stored in the storage device of the digital back end 327, the calibration stage is ended.

Step S69: After the calibration stage is over, the normal stage or so-called operation mode is automatically entered. The control chip 23 controls the multiple drive circuits 230 therein to respectively input, sequentially or concurrently, a drive signal Vsig to the corresponding drive electrode 211, wherein the drive signal Vsig is a continuous/non-continuous signal and periodic/non-periodic signal without particular limitations. Details of the concurrently driving may be referred to U.S. patent application Ser. No. 13/928,105, filed on Jun. 26, 2013, assigned to the same Assignee of the present application, and the full disclosure of which is incorporated herein by reference. Meanwhile, corresponding to a scan signal, which controls the sequential reading of each of the multiple sense electrodes 213, the digital back end 237 of the control chip 23 reads the pre-stored control code corresponding to the sense electrode 213 currently being scanned from the storage device to control the corresponding switching devices (e.g., 0 to 5 in FIG. 5) in the step current circuit 239 thereby reducing the offset current caused by the offset voltage difference between the IPGA 231 and the attenuation circuit 233.

Accordingly, it is able to effectively alleviate the operable dynamic range decrease caused by the offset voltage thereby increasing the signal-to-noise ratio and the detection performance.

It is appreciated that the values in the above embodiment such as the resistance, capacitance, voltage value, current value, number of switching devices and so on, are only intended to illustrate but not to limit the present disclosure.

As mentioned above, the signal processing circuit of a conventional touch panel has a lower dynamic range due to the offset voltage of an operational amplifier therein such that it has lower SNR and touch control performance Therefore, the present disclosure further provides a touch device (as shown in FIG. 2) and a signal processing circuit (as shown in FIGS. 4-5) as well as an operating method (as shown in FIG. 6) thereof that may eliminate the influence caused by the offset voltage of an operational amplifier by adopting a step current circuit to provide or draw a step current to cancel out or reduce at least a part of the current flowing through the feedback resistor of the operational amplifier.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A signal processing circuit of a touch device, the signal processing circuit comprising:
   an integrated programmable gain amplifier (IPGA), comprising:
   a first operational amplifier having a positive input, a negative input and an output terminal;
   a feedback resistor connecting between the negative input and the output terminal of the first operational amplifier;
   a compensation capacitor connecting between the negative input and the output terminal of the first operational amplifier; and
   an input resistor, a first terminal of the input resistor coupled to the negative input of the first operational amplifier;
   an attenuation circuit coupled to a second terminal of the input resistor to split a current flowing through the input resistor; and
   a step current circuit, coupled to the negative input of the first operational amplifier, and configured to provide a step current to the IPGA or draw a step current from the IPGA, the step current circuit comprising a current mirror circuit which comprises a plurality of switching devices configured to determine the step current during a touch detection according to previously stored control codes.

2. The signal processing circuit as claimed in claim 1, wherein the current flowing through the input resistor is an offset current formed by an offset voltage difference between the IPGA and the attenuation circuit.

3. The signal processing circuit as claimed in claim 1, further comprising a digital back end configured to
   previously store the control codes that cause a current flowing through the feedback resistor to have a smallest value, and
   control on/off of the plurality of switching devices according to the stored control codes for the touch detection.

4. The signal processing circuit as claimed in claim 1, wherein the attenuation circuit comprises:
   a second operational amplifier having a positive input, a negative input and an output terminal, and the output terminal of the second operational amplifier being coupled to the negative input of the second operational amplifier; and
   a shunt resistor having a first terminal being coupled to the output terminal of the second operational amplifier, and a second terminal being coupled to the second terminal of the input resistor.

5. A touch device, comprising:
   a capacitive touch panel comprising a plurality of sense electrodes each configured to output a detection signal;
   a control chip, comprising:
   a plurality of integrated programmable gain amplifiers (IPGAs) respectively coupled to the plurality of sense electrodes to amplify the detection signal, each of the IPGAs comprising:
   a first operational amplifier having a positive input, a negative input and an output terminal;
   a feedback resistor connecting between the negative input and the output terminal of the first operational amplifier;
   a compensation capacitor connecting between the negative input and the output terminal of the first operational amplifier; and
   an input resistor, a first terminal of the input resistor coupled to the negative input of the first operational amplifier;
   a plurality of attenuation circuits each coupled to a second terminal of the input resistor of one of the IPGAs, and configured to split a current flowing through the input resistor;
   a plurality of step current circuits each coupled to the negative input of the first operational amplifier of one of the IPGAs, and configured to provide a step current to the coupled IPGA or draw a step current from the coupled IPGA, each of the plurality of step current circuits comprising a current mirror circuit which comprises a plurality of switching devices configured to determine the step current to be provided to or drawn from the coupled IPGA during a touch detection according to previously stored control codes.

6. The touch device as claimed in claim 5, wherein the control chip further comprises:
an analog-to-digital converter, coupled to the output terminal of the first operational amplifier of each of the IPGAs, and configured to convert the amplified detection signal to a digital signal.

7. The touch device as claimed in claim 6, further comprising a digital back end coupled to the analog-to-digital converter and configured to
previously store the control codes that cause a current flowing through the feedback resistor to have a smallest value, and
control on/off of the plurality of switching devices of each of the plurality of step current circuits according to the stored control codes for the touch detection.

8. The touch device as claimed in claim 7, wherein the control chip further comprises a plurality of drive circuits configured to
output drive signals to the capacitive touch panel in the normal stage, and
not output the drive signals to the capacitive touch panel in the calibration stage.

9. The touch device as claimed in claim 5, wherein the control chip further comprises a storage device configured to store the control codes respectively corresponding to each of the plurality of IPGAs.

10. The touch device as claimed in claim 5, wherein each of the attenuation circuit comprises:
a second operational amplifier having a positive input, a negative input and an output terminal, and the output terminal of the second operational amplifier being coupled to the negative input of the second operational amplifier; and
a shunt resistor having a first terminal being coupled to the output terminal of the second operational amplifier, and a second terminal being coupled to the second terminal of the input resistor.

11. An operating method of a touch device, the touch device comprising a capacitive touch panel, an integrated programmable gain amplifier (IPGA), an attenuation circuit, a step current circuit and an analog-to-digital converter, the capacitive touch panel, the attenuation circuit, the step current circuit and the analog-to-digital converter being coupled to the IPGA, the attenuation circuit attenuating a gain of the IPGA, the step current circuit comprising a current mirror circuit which comprises a plurality of switching devices, the operating method comprising:
receiving, by the IPGA, a detection signal outputted by the capacitive touch panel to output an amplified detection signal;
converting, by the analog-to-digital converter, the amplified detection signal to a digital signal;
controlling on/off of the plurality of switching devices of the step current circuit to provide a step current to the IPGA or draw a step current from the IPGA according to the digital signal to reduce an offset current value caused by an offset voltage difference between the IPGA and the attenuation circuit; and
storing a control code for controlling the on/off of the plurality of switching devices to cause the offset current value to have a smallest value.

12. The operating method as claimed in claim 11, wherein after the control code is stored, the operating method further comprises:
controlling the plurality of switching devices of the current mirror circuit according to the stored control code.

13. The operating method as claimed in claim 11, wherein the IPGA comprises:
a first operational amplifier having a positive input, a negative input and an output terminal;
a feedback resistor connecting between the negative input and the output terminal of the first operational amplifier;
a compensation capacitor connecting between the negative input and the output terminal of the first operational amplifier; and
an input resistor, a first terminal of the input resistor being coupled to the negative input of the first operational amplifier, and a second terminal of the input resistor being coupled to the attenuation circuit.

14. The operating method as claimed in claim 11, wherein the attenuation circuit comprises:
a second operational amplifier having a positive input, a negative input and an output terminal, and the output terminal of the second operational amplifier being coupled to the negative input of the second operational amplifier; and
a shunt resistor having a first terminal coupled to the output terminal of the second operational amplifier, and a second terminal coupled to the IPGA.

* * * * *